Oct. 9, 1956         J. A. KARNS         2,766,047
                     GOLF-CLUB HEAD
                     Filed May 5, 1954
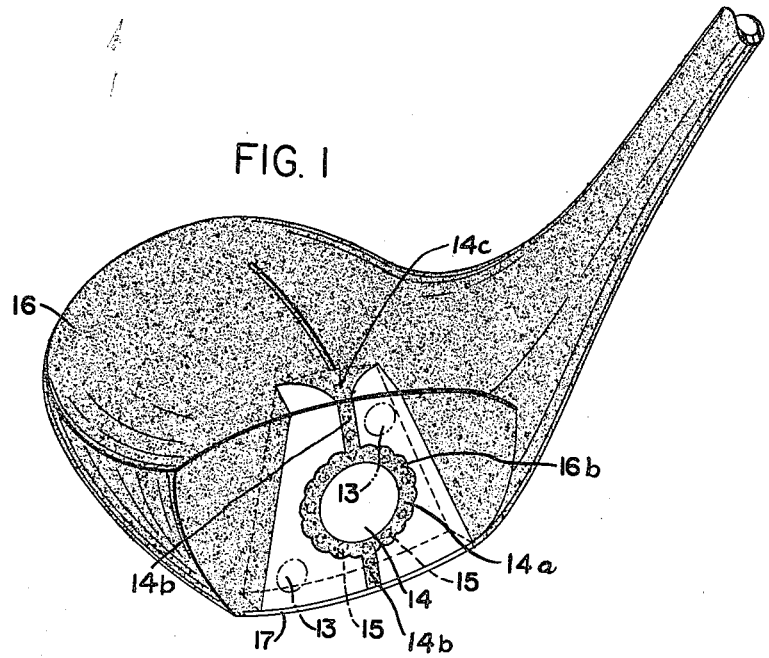
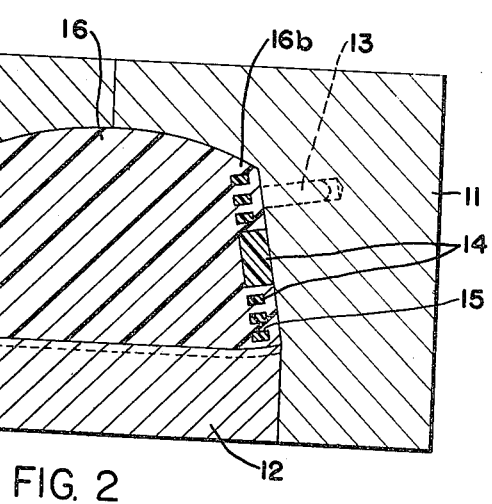
INVENTOR.
JAMES A KARNS
BY
Willard D. Eakin
ATTORNEY

United States Patent Office 2,766,047
Patented Oct. 9, 1956

2,766,047
GOLF-CLUB HEAD

James A. Karns, Akron, Ohio, assignor, by mesne assignments, to National Die Casting Company, Chicago, Ill., a corporation of Illinois Application May 5, 1954, Serial No. 427,717

6 Claims. (Cl. 273—164)

This invention relates to golf-club heads molded of plastic material, various plastic materials having been heretofore suggested for the molding of such products.

The chief objects of the present invention are to provide a golf-club head having the usual face plate but with an inlaid design in the face plate; to provide, and especially in conjunction with that feature, an improved structure for anchoring the face plate or the like in place as a part of the head; and to provide economy of manufacture of a golf-club head having a separately formed member such as a face plate securely anchored in place as a part of the head.

Of the accompanying drawings:

Fig. 1 is a perspective view of a golf-club head embodying and made in accordance with my invention in its preferred form.

Fig. 2 is a fore-and-aft middle vertical section of a mold in which the head is molded and of the untrimmed head as it lies in the mold at the end of the molding operation.

The mold comprises the usual extrusion-mold sections 10, 11, 12 except that the section 11 is formed on its cavity-defining face with a plurality of suitably spaced dowel holes for the reception of temporary dowels, such as the dowel 13, Fig. 2, formed upon a pre-shaped face-plate 14. The dowels are cut off of the face plate after the head has been molded, but the positions at which they originally project from the plate are indicated by the circular phantom lines 13, 13 in Fig. 1. As there shown, they are at positions not occupied by any part of the inlay design.

Many shapes of inlay designs are possible. Referring specifically to the one here shown, the face plate 14 is formed with grooves on its striking face of desired configuration, including a circular portion 14ᵃ from which extend vertical portions 14ᵇ, and from the upper end of the latter, another groove 14ᶜ extends from the striking face through the top edge face of the face plate. From the floor of the part of the groove that is in the striking face of the plate, holes 15, 15 extend rearwardly through the face plate.

In the molding operation stock 16, forming the main body of the club-head, and preferably of a different color from that of the face plate, is forced directly into the part 14ᶜ of the groove that is in the top edge face of the plate and also some of the stock is forced through the holes 15 and fills the groove portions 14ᵃ and 14ᵇ in the striking face of the face-plate.

Upon the hardening of the stock it not only has "riveted through" the holes but also stock passing into the striking-face groove through a plurality of the holes respectively has become unified by coalescing in the groove, so that elements of the face-plate are positively interlinked with elements of the main body of the club-head.

Although extrusion molding is preferred for obtaining proper flow and filling out of the stock in the mold and for avoidance of mold flash the invention is not wholly limited thereto, or to details of procedure for shaping and finishing the club-head. In the case of the particular apparatus here shown the mold section 12 forms a depression for reception of the usual sole plate 17 and the mold section 10, being formed with the inlet passage, leaves upon the head a sprue 16ᵃ which, like the dowels 13, is cut off in the finishing of the club-head.

The part of the inlay stock, 16ᵇ, which is in the large-volume part 14ᶜ of the groove that is upon the top face of the face-plate serves the double purpose of strongly resisting upward relative movement of the face plate and providing a visual aid in the proper use of the club. The stock extending through the holes 15 performs the double function of ornamentation and anchorage.

I claim:

1. A golf-club head comprising a main body of molded plastic material of substantial mass and having a striking face, and a separately formed face plate embedded in the body and having a striking surface exposed through and lying flush with the said striking face of the body, said face plate having interconnected groove portions in its striking surface and apertures extending through the floor of the groove portions, and having a top groove portion connected with the first groove portions extending through the top edge surface of the plate, the top edge surface of the plate being flush with the top surface of the body, and integral portions of the body extending through said apertures and filling all of the said groove portions and terminating flush with the striking face and top surfaces respectively of the body, the portion of the body in the top groove portion being centered transversely of the plate and serving as a visual aid in proper use of the club.

2. A golf club head comprising a main body of molded plastic material and a separately formed face plate embedded in and having a striking face exposed through and lying flush with the striking face of said head, said face plate being formed with a plurality of spaced-apart apertures all opening through said exposed surface thereof, a groove in said exposed face of said face plate extending upwardly through the top face of said face plate and into which said apertures open, and an integral portion of said body extending through and molded against the walls of said apertures, lying within said groove, and having a surface flush with said striking face of said face plate.

3. A golf club head comprising a main body of molded plastic material of substantial mass and having a striking face, and a separately formed face plate embedded in the body and having a striking surface exposed through and lying flush with the said striking face of the body, said face plate having groove portions in its striking surface and apertures extending through the floor of the groove portions, and having a top groove portion connected with the first groove portions extending through the top edge surface of the plate, the top edge surface of the plate being flush with the top surface of the body, and integral portions of the body extending through said apertures and filling all of the said groove portions and terminating flush with the striking face and top surface respectively of the body, the portion of the body in the top groove portion being centered transversely of the plate and serving as a visual aid in proper use of the club, said groove portions having at least one open end whereby said portions of the body filling said groove portions are integrally connected to said main body on the surface of said club head.

4. A golf club head comprising a main body of molded plastic material of substantial mass and having a striking face and a top surface, and a separately formed face plate embedded in said body and having a striking surface exposed through and lying flush with said striking face of said main body, said face plate having grooves in its striking surface, said face plate being exposed through and lying flush with the top surface of said body and having a transversely centered groove extending through the top exposed surface thereof, said grooves being filled with plastic material forming said main body, said face plate being of such configuration that said material in said grooves forms integral continuations of said main body.

5. A golf club head comprising a main body of molded plastic material of substantial mass and having a striking face and a top surface, and a separately formed face plate embedded in said body and having a striking surface exposed through and lying flush with said striking face of said main body, said face plate having grooves in its striking surface, said face plate being exposed through and lying flush with the top surface of said body and having a transversely centered groove extending through the top exposed surface thereof, said grooves being filled with plastic material forming said main body, said face plate being of such configuration that said material in each of said grooves forms an integral continuation of said main body linked to said main body at at least two spaced points.

6. A golf club head comprising a main body of molded plastic material of substantial mass and having a striking face and a top surface, and a separately formed face plate embedded in said body and having a striking surface exposed through and lying flush with said striking face of said main body, said face plate having grooves in its striking surface, said grooves being filled with plastic material forming said main body, said face plate being of such configuration that said material in each of said grooves forms an integral continuation of said main body linked to said main body at at least two spaced points.

References Cited in the file of this patent

UNITED STATES PATENTS

| 2,214,842 | Sweet et al. | Sept. 17, 1940 |
| 2,586,978 | Murray | Feb. 26, 1952 |

FOREIGN PATENTS

| 2,991 | Great Britain | 1907 |
| 376,277 | Great Britain | June 27, 1932 |